Patented Nov. 19, 1929

1,736,553

UNITED STATES PATENT OFFICE

GRAY SINGLETON, OF FORT MEADE, AND ROBERT P. THORNTON, OF LAKELAND, FLORIDA

PROCESS OF TREATING PHOSPHATE ROCK

No Drawing.   Application filed December 17, 1923.   Serial No. 681,231.

We have found that the large deposits of "soft phosphate", or wavellite, which occur in Florida and in several European countries, is composed largely of aluminum phosphate and that this aluminum phosphate is readily soluble in alkaline solutions of either potash, for example, potassium carbonate, or ammonia, forming water-soluble potassium or ammonium phosphate. Soft phosphate has heretofore been regarded as practically worthless because of the fact that when it is treated with sulphuric acid in the usual process of making acid phosphate aluminum sulphate is formed which remains wet and can not be used in mixed fertilizers. In our process neither the potassium phosphate nor the ammonium phosphate has this tendency to remain wet and gummy after treatment.

The advantages of our process are as follows:

The soft phosphate can be mined at much less expense than the pebble or hard rock forms of calcium phosphate. Our process is less expensive than the usual acidulation of tri-calcium phosphate. The product of our process is water-soluble and is therefore in the best possible condition for rapid assimilation by plants. Our process will make a complete fertilizer in one operation since the ammonium phosphate and potassium phosphate, both of which can be made in one operation, contain all three of the essential plant foods. In our experiments, material containing as high as 19% $P_2O_5$ has been made water-soluble by this process. This is higher than is usually obtained by the acid method with calcium phosphate. The product has no acid. This is an advantage since free acidity is considered detrimental by some.

The operation of the process is simple. The soft phosphate is moistened with an alkaline solution of either ammonia or potash as may be desired and is then allowed to stand for a short time so that the reaction may be complete. The length of time depends upon the strength of the solution. The product of this operation is then dried in any convenient manner, for instance, a rotary kiln, and is then ground and is ready for application as a fertilizer. Using soft phosphate, cyanamid and potash we find that we can make fertilizers of practically any desired grade in one operation.

What we claim is:

1. The herein described process of treating "soft phosphate" with a solution of ammonia to produce ammonium phosphate which is in a water soluble condition and suitable for plant food.

2. The herein described process of treating "soft phosphate" with an alkaline solution of both potash and ammonia to produce a complete fertilizer in one operation.

GRAY SINGLETON.
ROBT. P. THORNTON.